(12) United States Patent
Mandagere et al.

(10) Patent No.: US 10,175,745 B2
(45) Date of Patent: *Jan. 8, 2019

(54) OPTIMIZING POWER CONSUMPTION BY DYNAMIC WORKLOAD ADJUSTMENT

(71) Applicant: International Business Machines Corporation, Armonk, NY (US)

(72) Inventors: Nagapramod Mandagere, San Jose, CA (US); Seshashayee S. Murthy, Yorktown Heights, NY (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,013

(22) Filed: Oct. 11, 2016

(65) Prior Publication Data

US 2017/0031423 A1    Feb. 2, 2017

Related U.S. Application Data

(63) Continuation of application No. 13/905,432, filed on May 30, 2013, now Pat. No. 9,501,115, which is a
(Continued)

(51) Int. Cl.
*G06F 15/173* (2006.01)
*G06F 1/32* (2006.01)
(Continued)

(52) U.S. Cl.
CPC ............... *G06F 1/329* (2013.01); *G06F 1/26* (2013.01); *G06F 1/3203* (2013.01);
(Continued)

(58) Field of Classification Search
CPC . H04L 67/22; H04L 67/1002; H04L 67/1008; H04L 67/125
(Continued)

(56) References Cited

U.S. PATENT DOCUMENTS 7,127,625 B2   10/2006   Farkas et al.
7,171,668 B2    1/2007   Molloy et al.
(Continued)

FOREIGN PATENT DOCUMENTS

JP    2007179437    7/2007
JP    2008242614   10/2008
(Continued)

OTHER PUBLICATIONS

Moore et al. Making Scheduling "Cool": Temperature-Aware Workload Placement in Data Centers. In ATEC'05: Proceedings of the USENIX Annual Technical Conference 2005 on USENIX Annual Technical Conference. Berkeley, CA, USA: USENIX Association, 2005, 14 pages.*

(Continued)

*Primary Examiner* — Wing F Chan
*Assistant Examiner* — Andrew Woo
(74) *Attorney, Agent, or Firm* — Schmeiser, Olsen & Watts, LLP; Michael Petrocelli

(57) ABSTRACT

A method and system for optimizing power consumption of a data center by dynamic workload adjustment. Workload of the data center is dynamically adjusted from a current workload distribution to an optimal workload solution. The optimal workload solution is a candidate workload solution of at least one candidate workload solution having a lowest sum of a respective power cost and a respective migration cost. Each candidate workload solution represents a respective application map that specifies a respective workload distribution among application programs of the data center.

(Continued)

Dynamically adjusting the workload of the data center includes: estimating a respective overall cost of each candidate workload solution, selecting the optimal workload solution that has a lowest overall cost as determined from the estimating, and transferring the optimal workload solution to devices of a computer system for deployment.

18 Claims, 9 Drawing Sheets

Related U.S. Application Data continuation of application No. 12/713,776, filed on Feb. 26, 2010, now Pat. No. 8,489,745.

(51) Int. Cl.
    *G06F 9/50*     (2006.01)
    *G06F 1/26*     (2006.01)

(52) U.S. Cl.
    CPC .......... *G06F 9/5088* (2013.01); *G06F 9/5094* (2013.01); *Y02D 10/22* (2018.01); *Y02D 10/24* (2018.01); *Y02D 10/32* (2018.01)

(58) Field of Classification Search
    USPC ........................................ 709/223, 224, 226
    See application file for complete search history.

(56) References Cited

U.S. PATENT DOCUMENTS

| | | | |
|---|---|---|---|
| 8,489,745 | B2 | 7/2013 | Mandagere et al. |
| 2005/0055590 | A1 | 3/2005 | Farkas et al. |
| 2006/0259621 | A1 | 11/2006 | Ranganathan et al. |
| 2007/0094043 | A1 | 4/2007 | Bannai et al. |
| 2008/0004837 | A1 | 1/2008 | Zwinger et al. |
| 2008/0177424 | A1 | 7/2008 | Wheeler |
| 2013/0261826 | A1 | 10/2013 | Mandagere et al. |

FOREIGN PATENT DOCUMENTS

| | | |
|---|---|---|
| JP | 2009100122 | 9/2009 |
| JP | 2009252056 | 10/2009 |
| JP | 2010015192 | 1/2010 |
| WO | 2009137026 | 11/2009 |

OTHER PUBLICATIONS

Moore et al. Weatherman: Automated, Online, and Predictive Thermal Mapping and Management for Datacenters. Autonomic Computing, 2006. ICAC '06. IEEE International Conference on. pp. 155-164, Jun. 13-16, 2006.*

Brill, Kenneth G. Data Center Energy Efficiency and Productivity. [online]. 10 pages. [retrieved on Oct. 15, 2008]. Retrieved from the Internet: <www.uptimeinstitute.org/symp_pdf/(TUI3004C)DataCenterEnergyEfficiency.pdf>.

Chase et al. Balance of Power: Energy Management for Server Clusters. In Proc. of the 8th Workshop on Hot Topics in Operating Systems (HotOS VIII). [online]. 6 pages. [retrieved on Oct. 15, 2008]. Retrieved from the Internet: <www.cs.duke.edu/ari/publications/balance-of-power.pdf >.

Khargharia et al. Autonomic Power and Performance Management for Computing Systems. IEEE International Conference on Autonomic Computing, 2006. ICAC apos;06., Jun. 13-16, 2006. ISBN: 1-4244-0175-. pp. 145-154.

Mukherjee et al. Software Architecture for Dynamic Thermal Management in Data Centers. Communication Systems Software and Middleware, 2007. COMSWARE 2007. 2nd International Conference on. pp. 1-11, Jan. 7-12, 2007.

Nathuji et al. Exploiting Platform Heterogeneity for Power Efficient Data Centers. ICAC '07: Proceedings of the Fourth International Conference on Autonomic Computing. Washington, DC, USA: IEEE Computer Society, 2007, 10 pages.

Tang et al. Sensor-Based Fast Thermal Evaluation Model for Energy Efficient High-Performance Datacenters. Intelligent Sensing and Information Processing, 2006. ICISIP 2006. Fourth International Conference on, pp. 203-208, Oct. 15, 2006-Dec. 18, 2006.

International Search Report for International Application No. PCT/EP2011/051751, dated Jun. 8, 2011.

Notice of Allowance dated Feb. 26, 2010 for U.S. Appl. No. 12/713,776, filed Feb. 26, 2010, First Named Inventor Nagapramod Mandagere, Confirmation No. 5363.

German Office Action, dated Sep. 1, 2014, No. 11 2011 100 143.6, 4 pages.

Tolia et al., Unified Thermal and Power Management in Service Enclosures, Jul. 19-23, 2009, Proceedings of the ASME/Pacific Rim Technical Conference and Exhibition on Packaging and Integration of Electronic and Photonic Systems, MEMS, and MEMS, InterPACK, '09, 10 pages.

Office Action (dated Mar. 13, 2015) for U.S. Appl. No. 13/905,432, filed May 30, 2013.

Amendment (dated Jun. 15, 2015) for U.S. Appl. No. 13/905,432, filed May 30, 2013.

Office Action (dated Sep. 25, 2015) for U.S. Appl. No. 13/905,432, filed May 30, 2013.

Amendment (dated Dec. 28, 2015) for U.S. Appl. No. 13/905,432, filed May 30, 2013.

Final Office Action (dated Apr. 5, 2016) for U.S. Appl. No. 13/905,432, filed May 30, 2013.

Final amendment (dated Jun. 6, 2016) for U.S. Appl. No. 13/905,432, filed May 30, 2013.

Advisory Action (dated Jul. 5, 2016) for U.S. Appl. No. 13/905,432, filed May 30, 2013.

Notice of Allowance (dated Jul. 27, 2016) for U.S. Appl. No. 13/905,432, filed May 30, 2013.

Examination Report dated Sep. 1, 2017; Application No. GB1206890. 4, 7 pages.

* cited by examiner

OPTIMIZING POWER CONSUMPTION BY DYNAMIC WORKLOAD ADJUSTMENT

This application is a continuation application claiming priority to Ser. No. 13/905,432, filed May 30, 2013, now U.S. Pat. No. 9,501,115, issued Nov. 22, 2016, which is a continuation of Ser. No. 12/713,776, filed Feb. 26, 2010, U.S. Pat. No. 8,489,745, issued Jul. 16, 2013.

BACKGROUND OF THE INVENTION

The present invention discloses a system and associated method for continuously optimizing power consumption of a data center by dynamically adjusting workload distribution within the data center. Because conventional power consumption optimization methods focus only on physical placement and peak temperature of devices, assuming maximum or nameplate power specification of devices, but do not take utilization of the devices into account, the conventional optimization methods cannot dynamically and continuously optimize power consumption according to workloads of the data center.

BRIEF SUMMARY

According to one embodiment of the present invention, a method for optimizing power consumption of a data center by dynamic workload adjustment comprises receiving inputs from the data center, the data center comprising at least one device, said inputs comprising a physical device map, and a current application map, wherein the physical device map specifies three-dimensional locations of said at least one device within the data center, and wherein the current application map specifies how application programs of the data center are virtually mapped to said at least one device and a current workload distribution among the application programs; generating at least one candidate workload solution for the data center, wherein each candidate workload solution of said at least one candidate workload solution represents a respective application map that specifies a respective virtual mapping of the application programs to said at least one device and a respective workload distribution among the application programs; calculating a respective temperature profile for said each candidate workload solution by use of a thermal model, wherein a respective maximum temperature of the data center associated with the respective temperature profile determines a respective power cost of said each candidate workload solution; calculating a respective performance profile for said each candidate workload solution such that the respective performance profile is evaluated against performance requirements of the data center, wherein the respective performance profile determines a respective migration cost of said each candidate workload solution; and dynamically adjusting workload of the data center from the current workload distribution to an optimal workload solution, wherein the optimal workload solution is a candidate workload solution having a lowest sum of the respective power cost and the respective migration cost.

According to one embodiment of the present invention, a computer program product comprises a computer readable memory unit that embodies a computer readable program code. The computer readable program code contains instructions that, when run by a processor of a computer system, implement a method for optimizing power consumption of the data center by dynamic workload adjustment.

According to one embodiment of the present invention, a computer system comprises a processor and a computer readable memory unit coupled to the processor, wherein the computer readable memory unit containing instructions that, when run by the processor, implement a method for optimizing power consumption of the data center by dynamic workload adjustment.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for optimizing power consumption of the data center by dynamic workload adjustment.

DETAILED DESCRIPTION

Figure 1A:
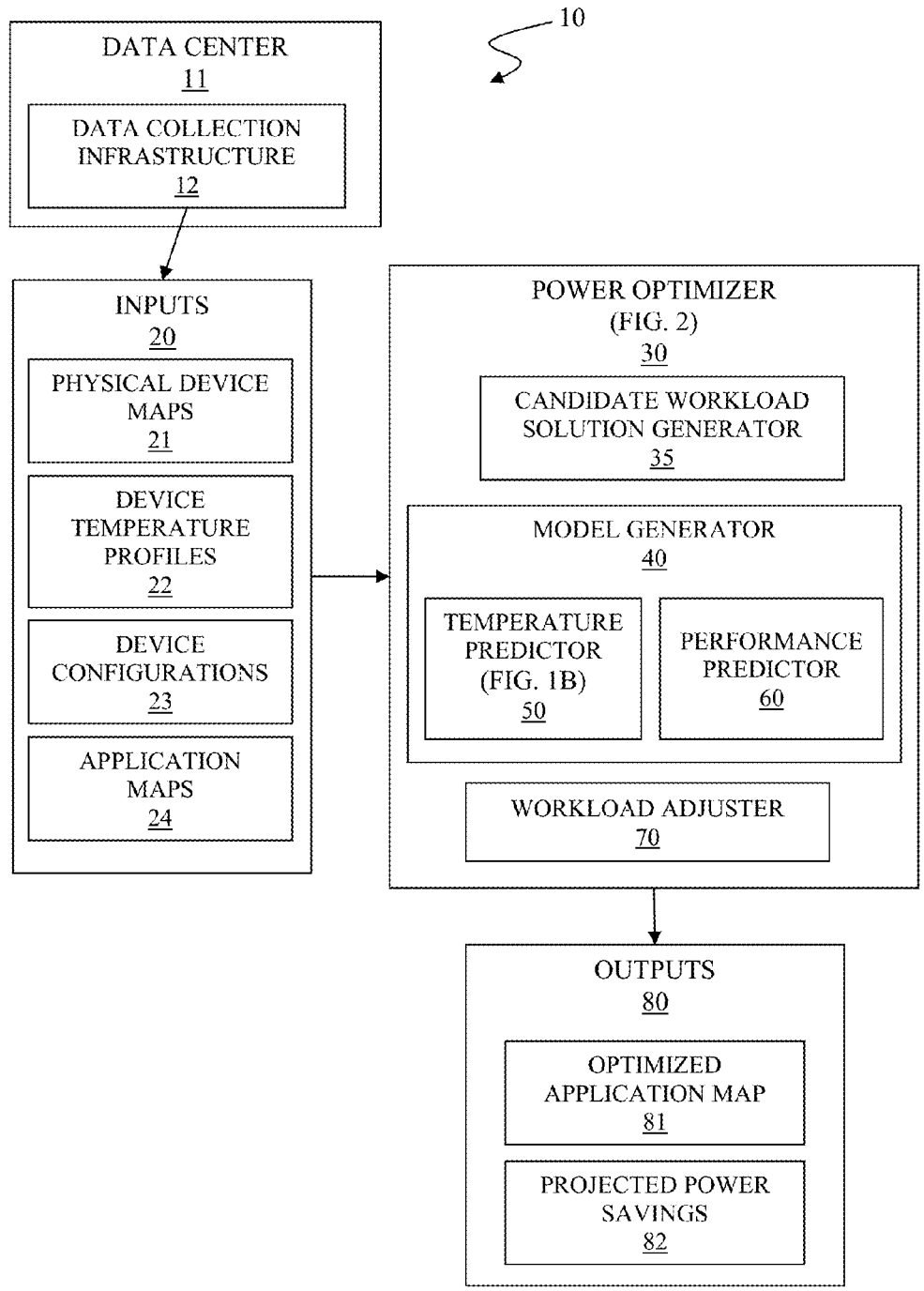
FIG. 1A illustrates a system for optimizing power consumption of a data center by dynamic workload adjustment, in accordance with embodiments of the present invention.

FIG. 1A illustrates a system 10 for optimizing power consumption of a data center by dynamic workload adjustment, in accordance with embodiments of the present invention.

The system 10 comprises a data center 11, inputs 20, a power optimizer 30, and outputs 80. The inputs 20 and the outputs 80 are stored in a computer readable storage medium. See descriptions of a memory device 94, 95 in FIG. 6, infra, for details of the computer readable storage medium. In this specification, the term "power" is used interchangeably with "electricity" and/or "electrical energy."

The data center 11 is defined as a physical room and a collection of hardware and software that reside and operate in the physical room. In this specification, the terms "hardware", "device", "equipment", "machinery", "resource" are used interchangeably to indicate at least one piece of physical machinery in the data center 11 such as server, storage device, communication device, and combinations thereof. The data center 11 is commonly utilized to provide system services such as web hosting, data warehousing, etc. Computer Room Air Conditioning units (CRACs) refer to one or more cooling units that cools the data center 11. The CRACs consumes significant amount of power, and consequently contributes significant percentage of total power costs for the data center 11. A room temperature within the data center 11 varies from one location to another, depending on several factors.

The data center 11 comprises a data collection infrastructure 12 that gathers information comprising the inputs 20 from various monitoring/management applications of the data center 11. The data collection infrastructure 12 also tracks usage information of the data center 11 to inform users whether the data center 11 performs up to Service Level Objectives (SLO). The SLO specifies required levels of service performance for respective services provided by the data center 11 under a service level agreement (SLA). Examples of the data collection infrastructure 12 may be, inter alia, conventional asset management software such as IBM® Maximo® Asset Management, a temperature sensor network, IBM TotalStorage® Productivity Center (TPC) data collection infrastructure, and combinations thereof. (IBM, Maximo and TotalStorage are registered trademarks of International Business Machines Corporation in the United States.)

The inputs 20 represent factors that are used by a power optimizer 30 to create the outputs 80. The inputs 20 comprise physical device maps 21, device temperature profiles 22, device configurations 23 and application maps 24.

The physical device maps 21 represent a physical layout/placement of all devices of the data center 11, in a three-dimensional (3D) coordinate (x, y, z) form. The 3D coordinate is necessary to precisely locate each device that is vertically stacked in racks within the data center 11. The physical layout of devices in the data center 11 represented by the physical device maps 21 impacts thermal dynamics and the operating temperature of the data center 11, and consequently impacts the amount of power consumed for temperature control of the data center 11.

The device temperature profiles 22 represent a collection of temperatures measured on a respective inlet of each device of the data center 11. The device temperature profiles 22 are represented in a respective 3D matrix T(x, y, z)=t, wherein t represents an inlet temperature of a device (x, y, z).

The device configurations 23 represents configuration of each device of the data center 11. In one embodiment of the present invention, the device configurations 23 comprise {ID, TEMP}, wherein ID is an identifier that indicates whether each device is a server or a storage device, and wherein TEMP is a respective temperature of the device for discrete utilization levels comprising (idle, busy) for each device. Wherein the device is in a first utilization level "idle", the device is in a base temperature. Wherein the device is in a second utilization level "busy", the device is in a peak temperature.

The application maps 24 represents information on how applications are virtually mapped to servers and storage devices and on how workloads of applications are distributed among the devices of the data center 11. The application maps 24 are also referred to as a virtual machine (VM) map. The application maps 24 represent the usage of the devices as a function of the total application workload. With changes in the application configuration and/or placement, the mapping values are modified.

The power optimizer 30 takes the inputs 20 from the data center 11 and produces the outputs 80 that comprises optimized application maps 81 and projected power savings 82. The power optimizer 30 comprises a candidate workload solution generator 35, a model generator 40 and a workload adjuster 70. See descriptions of FIG. 2, infra, for steps performed by the power optimizer 30.

The candidate workload solution generator 35 generates at least one candidate workload solution, $X_{candidate}$, that denotes a mapping of a set of workloads to a combination of servers and storages. The set of workloads is fixed for all candidate workload solutions and a respective mapping is made for a distinctive combination of resources comprising servers and storages. The power optimizer 30 evaluates the candidate workload solutions to generate a workload distribution of the outputs 80.

The model generator 40 takes the inputs 20 from the data center 11 and generates prediction models. The prediction models comprise a thermal model, a device power model and a device performance model. Each prediction model is stored as a set of computer executable rules that are utilized by the power optimizer 30 to calculate a respectively predicted result from a set of predefined parameters for each prediction model. The model generator 40 generates the device power model and the device performance model by use of the device configurations 23 and the application maps 24 of the inputs 20. The model generator 40 comprises a temperature predictor 50 and a performance predictor 60.

The temperature predictor 50 creates the thermal model that is a mathematical model that dynamically predicts the temperature of the data center 11. Examples of thermal factors accounted in the thermal model may be, inter alia, a respective device inlet temperature, etc. The highest device inlet temperature in the device temperature profile 22 determines operational settings of cooling units in the data center 11, operational efficiency of the cooling units, and consequently cooling costs and power consumed for cooling the data center 11. Each device inlet temperature is affected by, inter alia, a physical layout of devices in the data center 11 as represented in the physical device maps 21, the device configurations 23, a workload distribution as represented in the application maps 24. See descriptions of FIG. 1B, infra, for components of the temperature predictor 50, and FIG. 3, infra, for steps performed by the temperature predictor 50.

The performance predictor 60 takes the device performance model generated by the model generator 40 and the candidate workload solutions generated by the candidate workload solution generator 35 as inputs. The performance predictor 60 generates outputs comprising a respective expected performance of each candidate workload solution. See descriptions of FIG. 4, infra, for steps performed by the performance predictor 60.

The workload adjuster 70 evaluates respective performances, power consumptions and temperatures of each candidate workload solution by use of the prediction models and a migration cost model, and generates the outputs 80 comprising the optimized application maps 81 and the projected power savings 82. The optimized application maps 81 represent at least one workload distribution that optimizes power consumption of the data center 11. The projected power savings 82 is multiple amounts of reduced power consumption that are respectively associated with each instance of the optimized application maps 81.

In the workload adjuster 70, the migration cost model captures performance/power/availability tradeoff and quantifies performance degradation in transit from a current workload distribution to a selected candidate workload solution to find a workload distribution that meets performance requirements the data center 11 and consumes the least amount of power. In this specification, the term "optimization" means dynamically adjusting workload among virtualized equipments of the data center 11 to generate less heat while providing the same level of services and consequently reducing the amount of electricity necessary for temperature control in the data center 11. See descriptions of FIG. 5, infra, for steps performed by the workload adjuster 70.

Figure 1B:
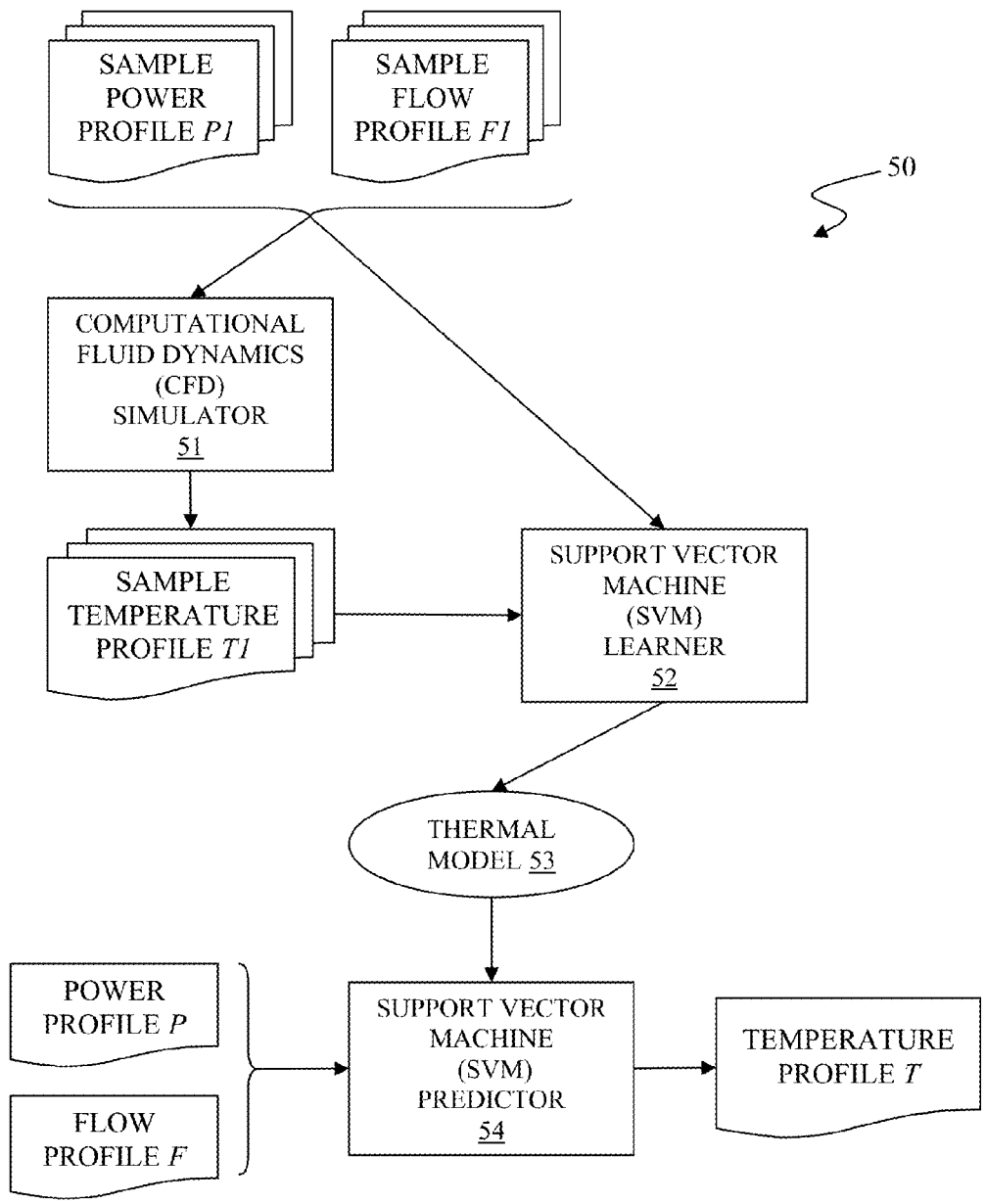
FIG. 1B illustrates the temperature predictor of FIG. 1A, in accordance with embodiments of the present invention.

FIG. 1B illustrates the temperature predictor 50 of FIG. 1A, supra, in accordance with embodiments of the present invention.

The temperature predictor generates at least one sample data from the physical device maps, the device configurations and the applications maps from the data center. A first pair of sample data (P1, F1) of said at least one sample data comprises a first sample power profile P1 and a first sample flow profile F1. The first sample power profile P1 represents a sample instance of power consumption of the data center comprising power consumption amounts by individual devices of the data center. The first sample flow profile F1 represents a sample heat flow within the data center based on usage of devices of the data center. The first pair of sample data (P1, F1) is generated randomly within a respective range of realistic values for the purpose of simulating thermal dynamics.

A computational fluid dynamics (CFD) simulator 51 takes multiple pairs of sample data (Pn, Fn) as inputs and generates multiple sample temperature profile Tn that corresponds to each pair of sample data (Pn, Fn). A first sample temperature profile TI represents a set of simulated inlet temperatures of individual devices in the data center where power consumption and heat flow of the data center are provided by the first pair of sample data (P1, F1). Each sample temperature profile is represented in a format identical to the device temperature profile of the inputs from the data center, with temperatures simulated by the CFD simulator 51 instead of actual temperatures measured from the data center as in the device temperature profiles. The CFD simulator 51 uses multiple pairs of sample data and simulates multiple temperature profiles respectively corresponding to each pairs of sample data to create a data set large enough for thermal dynamics modeling.

A support vector machine (SVM) learner 52 generates a thermal model 53 from the generated sample data, (Pn, Fn), and the simulated sample temperature profile corresponding to the generated sample data, Tn. All pairs of the sample data and the corresponding sample temperature profile are collectively referred to as training data for the SVM learner 52. The thermal model 53 formulates how the power consumption and the overall heat flow of the data center affects inlet temperatures of individual devices in the data center, as learned by the SVM learner 52 from the training data.

A pair of actual data (P, F) comprises a power profile P and a corresponding flow profile F. The power profile P represents an actual instance of power consumption of the data center comprising power consumption amounts measured from individual devices of the data center. The flow profile F represents an actual instance of measured heat flow within the data center determined by usage of devices of the data center corresponding to the power profile P.

A support vector machine (SVM) predictor 54 applies the thermal model 53 to the pair of actual data (P, F) and generates a temperature profile T that represents respective inlet temperatures of individual devices of the data center as predicted by the thermal model 53 when the power consumption and the heat flow of the data center are represented by the pair of actual data (P, F).

Figure 2:
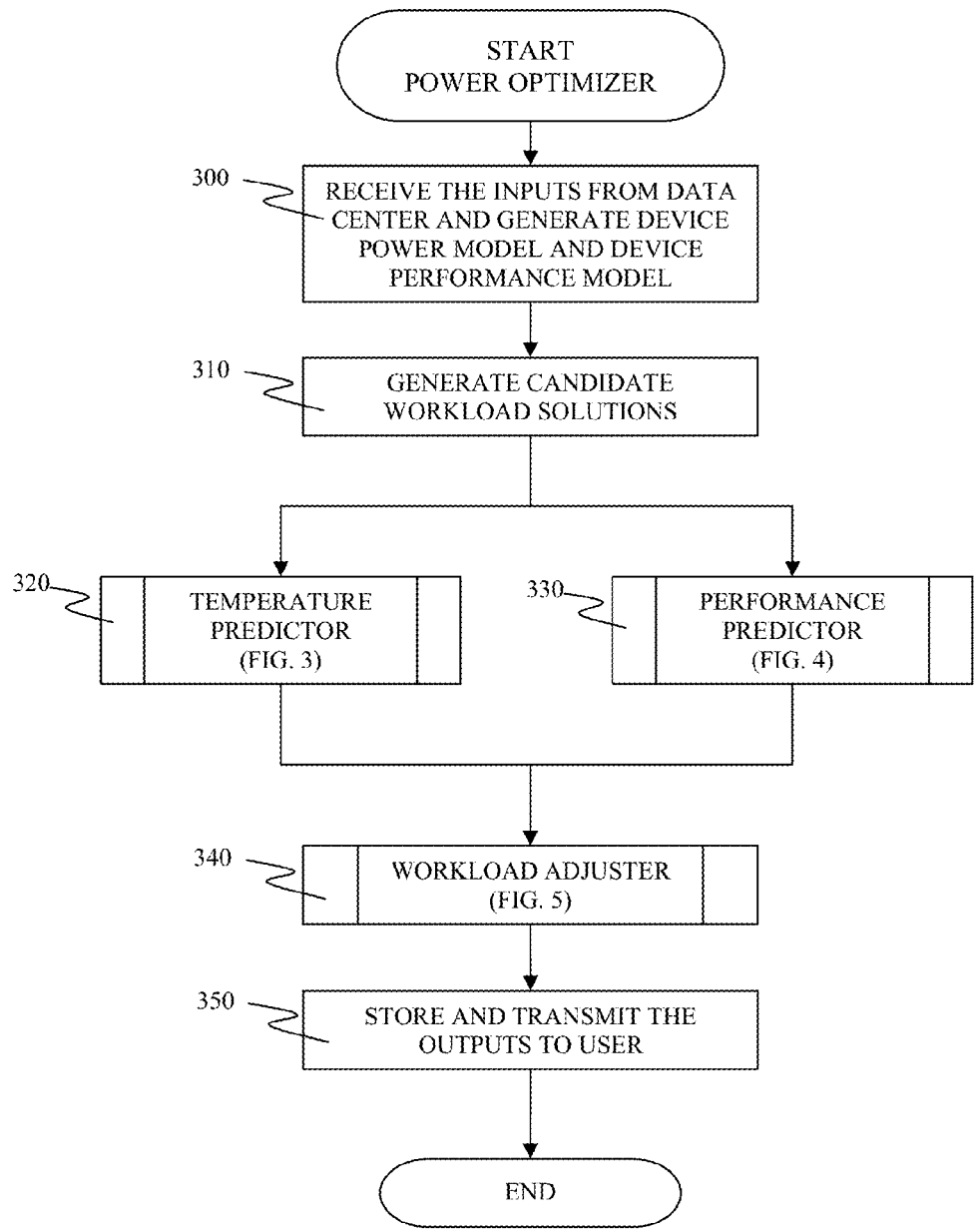
FIG. 2 is a flowchart depicting a method for optimizing power consumption of a data center by dynamic workload adjustment, which is performed by a power optimizer of the system of FIG. 1A, in accordance with the embodiments of the present invention.

FIG. 2 is a flowchart depicting a method for optimizing power consumption of a data center by dynamic workload adjustment, which is performed by a power optimizer of the system of FIG. 1A, supra, in accordance with the embodiments of the present invention.

In step 300, the power optimizer receives inputs from the data center and generates at least one device power model and at least one device performance model with a model generator. The inputs collected from the data center comprise the physical device maps, the device temperature profiles, the device configurations and the application maps as described in FIG. 1A supra. The model generator creates said at least one device power model by use of conventional methods for power modeling with the device configurations and the application maps of the inputs. The model generator also creates said at least one device performance model for each device type based on conventional methods for performance modeling. See descriptions of a performance predictor in FIG. 4, infra, for usage of the device performance model in a specific platform represented by the device configurations and the application maps of the inputs. Then the power optimizer proceeds with step 310.

In one embodiment of the present invention, the model generator creates two device power models comprising a computing device power model and a storage device power model. In this specification, the term "utilization" indicates a ratio of a current workload to a maximum workload that a device can handle. Utilization of a device may have a value selected from {idle, busy} depending on a range of the ratio. The computing device power model represents power consumption of computing devices respective to utilization of the computing devices that primarily performs computation. An example of the computing devices may be, inter alia, a server, etc. Wherein power consumption of the computing devices is 100 when utilization of the computing device is "idle," the computing device power model quantifies power consumption of the computing devices with a number in a range of 130 to 140 when the computing device is "busy." The storage device power model represents power consumption of storage devices respective to utilization of the storage devices that primarily performs data operation. An example of the storage devices may be, inter alia, a disk array, etc. Wherein power consumption of the storage devices is 100 when the storage device is "idle," the storage device power model quantifies power consumption of the storage devices with a number in a range of 110 to 130 when the storage device is "busy."

In the same embodiment, each device power model has at least two components comprising a static value representing power consumption when the respective device is "idle" and a second variable representing power consumption when the respective device performs an operation, that is, when the respective device is "busy," which varies linearly with utilization of the respective device.

In step 310, the power optimizer generates candidate workload solutions that map a set of workloads for a current workload distribution to multiple different device configurations by use of the candidate workload solution generator. All possible combinations of different numbers of server-storage pair that are available in a platform can be employed as a device configuration of a candidate workload solution. The candidate workload solution generator also utilizes heuristics/best-practice device configuration based on domain knowledge to create the candidate workload solutions. The candidate workload solutions are made available to the temperature predictor and the performance predictor. Then the power optimizer proceeds with steps 320 and 330, which can run concurrently.

In step 320, the power optimizer runs the temperature predictor. The temperature predictor takes inputs of physical device maps, device temperature files and the device power model, and generates a respective data center temperature profile for each candidate workload solution. See descriptions of FIG. 3, infra, for details of the temperature predictor. Then the power optimizer proceeds with steps 340.

In step 330, the power optimizer runs the performance predictor. The performance predictor generates the device performance model and produces performance prediction formula and a respective predicted performance for each candidate workload solution. See descriptions of FIG. 4, infra, for details of the performance predictor. Then the power optimizer proceeds with steps 340.

In step 340, the power optimizer runs the workload adjuster. The workload adjuster takes the respective data center temperature profile and the respective predicted performance for each candidate workload solution and generates outputs comprising at least one optimized workload distribution and power savings corresponding to respective optimized workload distribution. See descriptions of FIG. 5, infra, for details of the workload adjuster. Then the power optimizer proceeds with steps 350.

In step 350, the power optimizer stores and transmits the outputs generated by the workload adjuster to a user. The user may be, inter alia, an administrator of the data center, etc. The user subsequently utilize the outputs by, inter alia, adjusting workload distribution, updating information of the data center comprising inputs to reflect a current status of the data center, etc. Then the power optimizer terminates.

Figure 3:
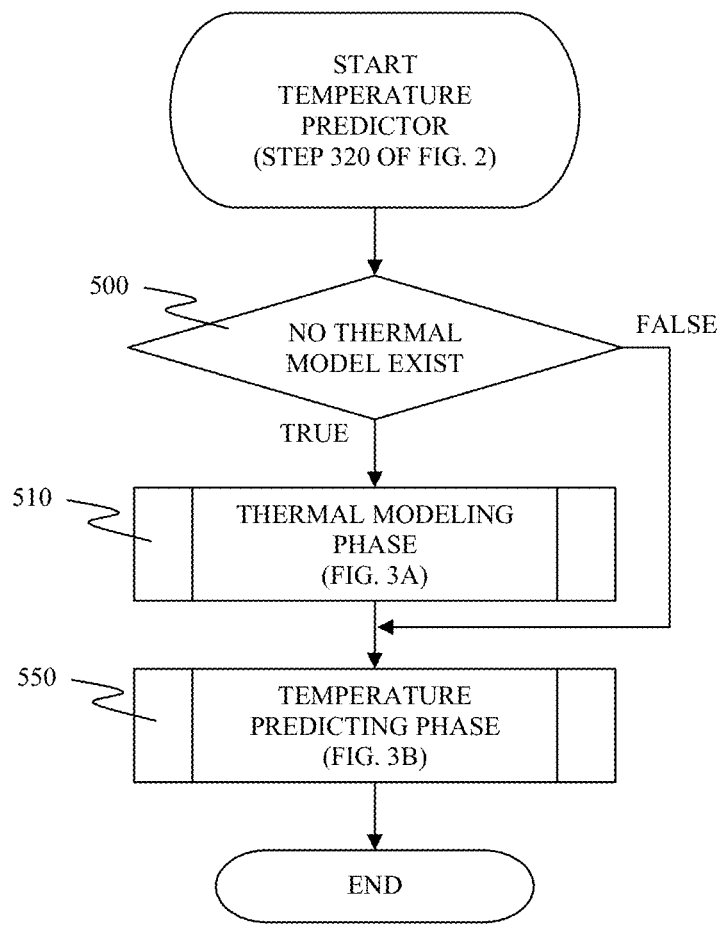
FIG. 3 is a flowchart depicting a method for predicting thermal characteristics of devices of a data center, which is performed by a temperature predictor of the power optimizer, in accordance with embodiments of the present invention.

FIG. 3 is a flowchart depicting a method for predicting thermal characteristics of devices of a data center, which is performed by a temperature predictor of the power optimizer, in accordance with embodiments of the present invention.

The temperature predictor operates in two phases. In step 500, the temperature predictor determines whether a thermal model has already been created for the power optimizer. If the temperature predictor determines that the thermal model does not exist yet, then the temperature predictor proceeds with step 510 starting from a first phase that creates the thermal model from training samples. If the temperature predictor determines that the thermal model already exists, then the temperature predictor proceeds with step 550 starting from a second phase that predicts temperatures for the candidate workload solutions from step 310 supra.

In step 510, the temperature predictor performs operations of the first phase referred to as a thermal modeling phase. See description of FIG. 3A infra for details of the thermal modeling phase.

In step 550, the temperature predictor performs operations of the second phase referred to as a temperature predicting phase. See description of FIG. 3B infra for details of the temperature predicting phase.

Figure 3A:
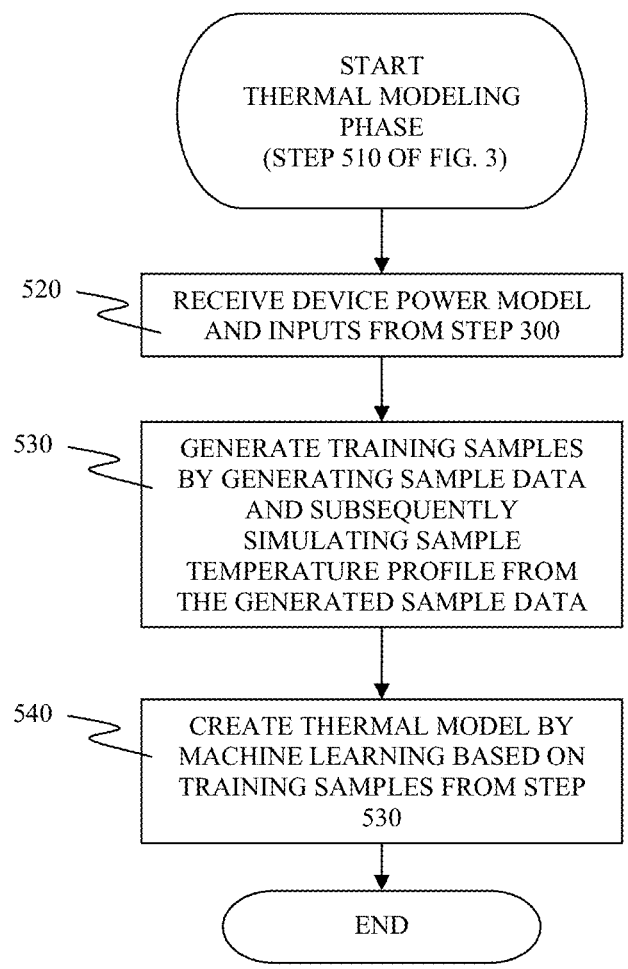
FIG. 3A is a flowchart depicting the thermal modeling phase of the temperature predictor of the power optimizer, in accordance with embodiments of the present invention.

FIG. 3A is a flowchart depicting the thermal modeling phase of the temperature predictor of the power optimizer, in accordance with embodiments of the present invention.

In step 520, the temperature predictor retrieves physical device maps, device temperature profiles from inputs, and a power model of the data center from the model generator. The physical device maps and the device temperature profiles are made available from the inputs to the power optimizer. The power model of the data center is based on a simulation or analytical approach that takes into account the usage of the respective devices combined with the power profiles. The power model is defined for the data center as a three-dimensional matrix representing power consumed by various devices of the data center pursuant to a respective device power model. After step 520, the temperature predictor proceeds with step 530.

In step 530, the temperature predictor generates training samples comprising a pair of sample data comprising a sample power profile and a sample flow profile, and a sample inlet temperature profile respectively corresponding to the pair of sample data. The temperature predictor first generates multiple pairs of sample data (power profile Pn, flow profile Fn) by sampling and then generates the corresponding sample inlet temperature profiles by simulating the sample power profiles and the sample flow profiles with a conventional Computational Fluid Dynamics (CFD) simulator. Each sample power profile represents a respective power consumption of the data center. The respective power consumption may be represented as an amount of heat generated by each device of the data center. Each sample flow profile represents a respective flow rate of fans in each device of the data center. The training samples are made available for step 540. Then the temperature predictor proceeds with step 540.

In one embodiment of the present invention, the temperature predictor utilizes a FloVENT® Computational Fluid Dynamics (CFD) simulator to generate the sample inlet temperature profiles from sample power profiles and sample flow profiles. (FloVENT is a registered trademark of Mentor Graphics Corporation in the United States.)

In step 540, the temperature predictor creates the thermal model by applying a machine learning process on the training samples generated in step 530. The thermal model demonstrates a simulated collective thermal behavior of all devices in the data center. The thermal model is represented as a set of functions that map parameters in a power profile and a flow profile to each inlet temperature in the inlet temperature profile. Then the temperature predictor proceeds with step 550 of FIG. 3 supra for the second phase of the temperature predictor.

In one embodiment of the present invention, the machine learning process of step 530 is a Support Vector Machine (SVM) learner that develops mathematical functions of the thermal model from a large set of data derived using above mentioned Flovent simulations.

Figure 3B:
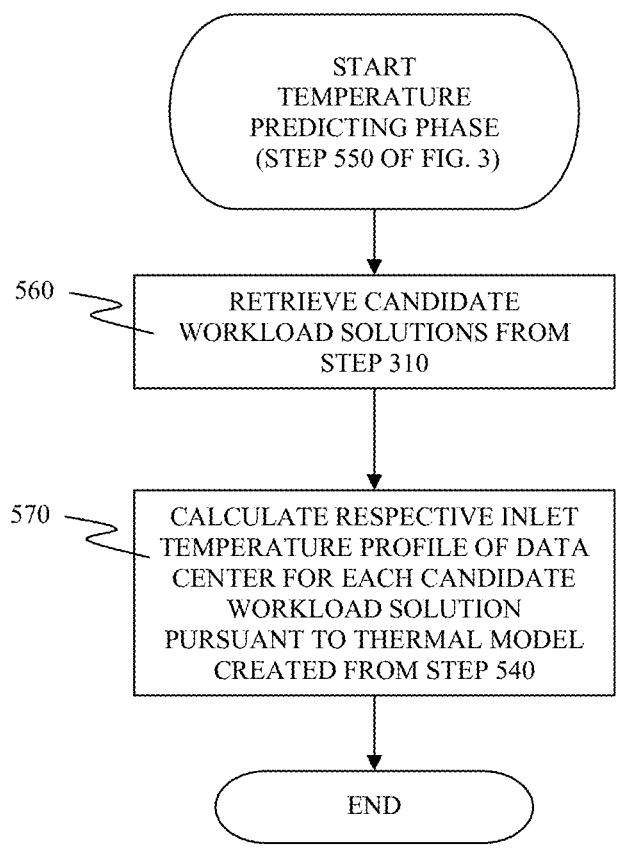
FIG. 3B is a flowchart depicting the temperature predicting phase of the temperature predictor of the power optimizer, in accordance with embodiments of the present invention.

FIG. 3B is a flowchart depicting the temperature predicting phase of the temperature predictor of the power optimizer, in accordance with embodiments of the present invention.

In step 560, the temperature predictor receives candidate workload solutions created in step 310 of FIG. 2 supra. Then the temperature predictor proceeds with step 570.

In step 570, the temperature predictor calculates the temperature profile of the data center for the candidate workload solutions by use of a Support Vector Machine (SVM) predictor pursuant to the thermal model created in step 510 supra. Support Vector Machines are a set of related supervised conventional learning methods used for classification and regression, which regards input data as two data sets of vectors in an n-dimensional space, and constructs a separating hyperplane in the n-dimensional space such that the separating hyperplane maximizes a margin between the two data sets. The temperature predictor formulates the temperature profile of the data center as a function of the application and/or virtual machine to physical resource mapping such that the temperature predictor calculates the temperature profile of the data center from workload values of the candidate workload solutions to devices of the data center and the physical device maps. Then the temperature predictor terminates and the power optimizer proceeds with the workload adjuster of step 340 in FIG. 2 supra.

Figure 4:
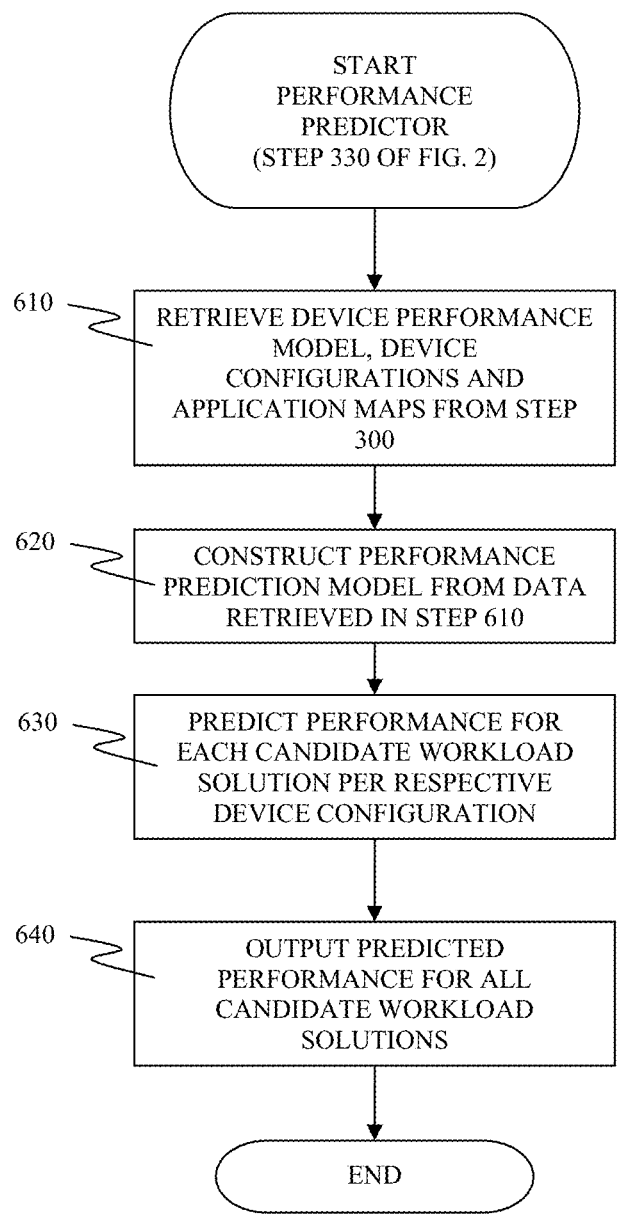
FIG. 4 is a flowchart depicting a method for predicting performance of devices of a data center, which is performed by a performance predictor of the power optimizer, in accordance with embodiments of the present invention.

FIG. 4 is a flowchart depicting a method for predicting performance of devices of a data center, which is performed by a performance predictor of the power optimizer, in accordance with embodiments of the present invention.

In step 610, the performance predictor retrieves device performance models generated in step 300 and inputs related to performance characteristics, which comprises the device configurations and the application maps of the data center. The device configurations and the application maps, which affect performance of an application on a platform, are utilized to create a performance prediction model of the application on the platform. The platform comprises at least one server and at least one storage device. The term "server" is used interchangeably with the term "computing device" in this specification. The device configurations describe how devices are configured in the platform and the application maps describe how workloads of the application are distributed over the platform. Each component device of the platform corresponds to a respective device performance model generated in step 300 of FIG. 2, supra. Then the performance predictor proceeds with step 620.

In step 620, the performance predictor constructs the performance prediction model that is derived from the performance characteristics inputs of the platform and the device performance models. The performance prediction model is applicable to variations of the performance characteristics inputs of the platform. For example, when a device configuration of the platform is (two server, two storage), the performance prediction model derived from the device configuration is utilized to predict performance of all possible device configurations of the platform, inter alia, (single server, single storage), (single server, two storage), (two server, single storage), and (two server, two storage). The power optimizer utilizes the performance prediction model in evaluating a performance of each candidate workload solution that is generated in step 310 of FIG. 2, supra. See descriptions of FIG. 5, infra, for details of evaluating each candidate power optimization solution. Then the performance predictor proceeds with step 630.

The performance prediction model of the present invention, EQ. 1 to EQ. 4 infra, takes workload characteristics into account in predicting performance of the data center, also referred to as a rate of executing the workload, as below:

$$IPS(W) = \frac{frequency}{CPI(W)} = \frac{frequency}{CPI_{core} + CPI_{memory}} \quad [\text{EQ. 1}]$$

$$CPI(W) = CPI_{core} + CPI_{memory} \quad [\text{EQ. 2}]$$

where IPS(W) represents Instructions Per Second of workload W, frequency indicates an operating frequency of a device, CPI(W) represents Cycles Per Instruction of workload W, $CPI_{core}$ represents Cycles Per Instruction spent in a core of a processor including a cache, and $CPI_{memory}$ represents Cycles Per Instruction spent in memory access. The performance measured in IPS(W) is a metric determined by a Service Level Agreement (SLA) specification. Once the operating frequency of a device is determined for a respective device as a platform is configured, the IPS(W) is determined by CPI(W).

$CPI_{core}$ is independent from the operating frequency of the processor, but $CPI_{memory}$ is affected by the operating frequency of a memory device as below:

$$CPI_{core} = CPI(f_1)(W) = CPI_{core}(f_1) + MPI \times M_{latency} \times BF(f_1) \quad [\text{EQ. 3}]$$

$$\begin{aligned} CPI_{memory} &= CPI(f_2)(W) \\ &= CPI_{core}(f_1) + MPI \times M_{latency} \times (f_2/f_1) \times \\ &\quad BF(f_1) \end{aligned} \quad [\text{EQ. 4}]$$

wherein $f_1$ is a first operating frequency of a server, $f_2$ is a second operating frequency of a storage device, MPI indicates a number of Memory accesses Per Instruction, $M_{latency}$ is a memory latency that is a time lapse from issuing an memory address for a memory access to having data of the memory address available, and BF is a block factor that quantifies parallelism in memory access and core processing, representing a number of records of a fixed size within a single block of memory.

The performance predictor utilizes the performance prediction model of EQ. 1 to EQ. 4 supra to predict workload behavior for various platforms configuring different memory types, cache sizes, etc. Conventional performance model focus on predicting how a same homogeneously computation-bound workload is run on various system configurations comprising distinctive processors of different clock speeds, different memory sizes and cache sizes.

In addition to workload and operating frequencies of devices, the performance predictor also accounts multiple distinctive server systems that differ in respective architectural details, combined with different types of storage devices for the respective server system, as provided by the device configuration of the inputs. The performance predictor selects a limited number of server architectures and applies respective server architecture to the performance prediction model of EQ. 1 to EQ. 4 supra. The respective server architecture selected may have a multiple number of servers. The performance prediction model for heterogeneous server and storage device combinations is formulated as:

$$IPS(W)(s, d_i) = \frac{S_{frequency}}{CPI(W)} \quad [\text{EQ. 1A}]$$

$$\begin{aligned} CPI(W) &= \sum_i CPI(W)(s, d_i) \\ &= \sum_i (CPI_{server}(s, d_i) + CPI_{storage}(s, d_i)) \end{aligned} \quad [\text{EQ. 2A}]$$

wherein $IPS(W)(s, d_i)$ indicates Instruction Per Second with a workload W in a platform with a fixed server configuration s and an i-th storage device configuration $d_i$, wherein $CPI(W)(s, d_i)$ indicates Cycles Per Instruction with the workload W in the platform with the fixed server configuration s and the i-th storage device configuration $d_i$, and wherein $s_{frequency}$ indicates a third operating frequency of servers represented in the fixed server configuration s.

In EQ. 2A, CPI(W) represents the Cycles Per Instruction with the workload W, that is formulated as a sum of $CPI_{server}$ and $CPI_{storage}$ in a platform configured with the fixed server configuration s and the i-th storage device configuration $d_i$ for all storage device configurations in the platform. $CPI_{server}$ represents cycles consumed by servers in the platform when the workload W can run entirely from memory without any disk access. $CPI_{server}$ indicates a Cycles Per Instruction $CPI_{server}$ for any workload is independent from system frequency and storage configuration. $CPI_{storage}$ represents cycles consumed by storage devices in the platform. $CPI_{storage}$ represents the impact of storage properties on number of cycles to process the workload, CPI(W). The storage properties accounted in the $CPI_{storage}$ may be, inter alia, latency, bandwidth, parallelism measured in disk block factor, etc. The performance predictor first characterizing $CPI_{storage}$ for different workloads to predict performance of the same workload W on a same server with different storage configurations.

In one embodiment of the present invention, cycles consumed by servers and cycles consumed by storage devices are formulated as below:

$$CPI_{server}(s,d_i) = CPI_{server}(s) \quad [\text{EQ. 3A}]$$

$$CPI_{storage}(s,d_i) = DIOPI \times Avg(LUN_{latency}(d_i)(W)) \times DBF \quad [\text{EQ. 4A}]$$

wherein DIOPI indicates a number of Disk Input/Output Per Instruction, wherein $Avg(LUN_{latency}(d_i)(W))$ indicates an average of latency of respective logical volume unit in the i-th storage device configuration $d_i$ with the workload W. The latency of respective logical volume unit ($LUN_{latency}$) is a function of storage configuration parameters and characteristics of workload. Examples of the storage configuration parameters may be, inter alia, a constituent disk latency, a number of constituent disks, a random/sequential bandwidth of constituent disks, a cache size, etc. Examples of the characteristics of workload may be, inter alia, randomness, sequentially, cache hit ratio, etc. $LUN_{Latency}$ is a main configuration parameter that affects the performance of the platform and a regression model of $LUN_{Latency}$ is utilized by the performance predictor.

In another embodiment of the present invention, steps 610 and 620 may be performed by the model generator. In the same embodiment, the performance predictor takes the at least one performance prediction model generated by the model generator as an input and generates expected performance values of the data center as described in step 630 infra.

In step 630, the performance predictor predicts a respective performance of each candidate workload solution that is associated with a respective platform configuration. The performance predictor applies the performance prediction model to the performance characteristics of the inputs, the candidate workload solutions, and the respective platform configuration of each candidate workload solution. The predicted performance is quantified in Instructions Per Seconds (IPS), etc. Then the performance predictor proceeds with step 640.

In step 640, the performance predictor stores the predicted performances for all candidate workload solutions to memory devices and make available to the workload adjuster. Then the performance predictor terminates and the power optimizer continues with step 340 of FIG. 2 supra.

Figure 5:
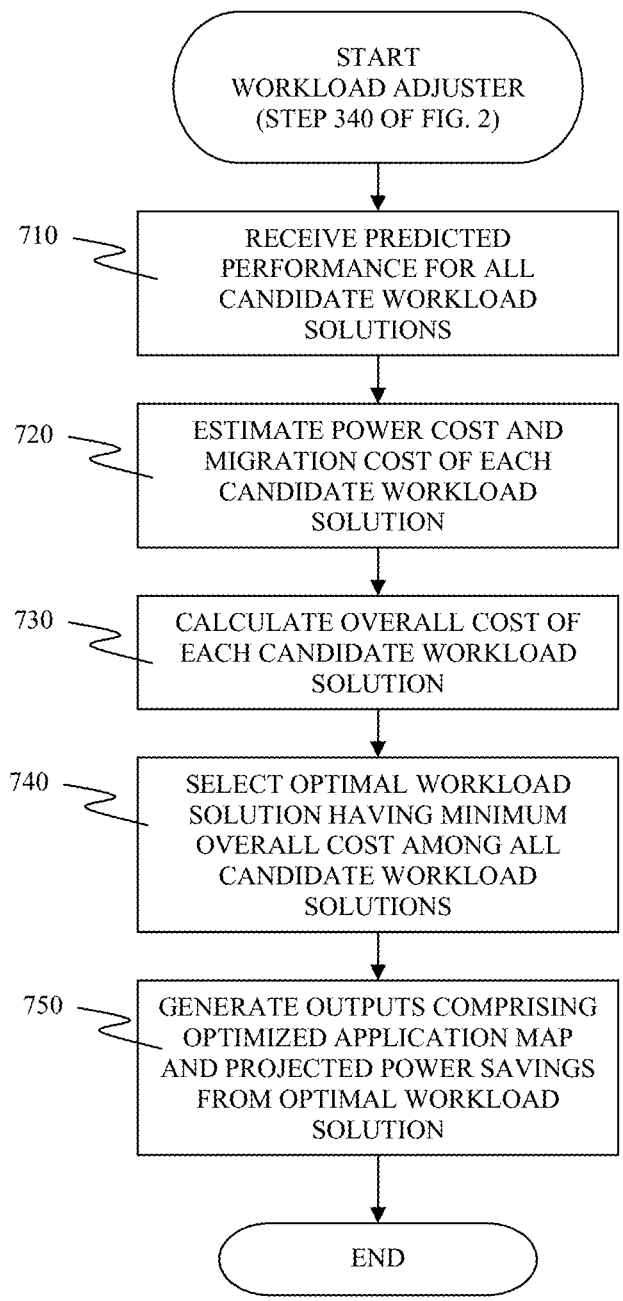
FIG. 5 is a flowchart depicting a method for dynamically adjusting workloads among devices of a data center, which is performed by a workload adjuster of the power optimizer, in accordance with embodiments of the present invention.

FIG. 5 is a flowchart depicting a method for dynamically adjusting workloads among devices of a data center, which is performed by a workload adjuster of the power optimizer, in accordance with embodiments of the present invention.

In step 710, the workload adjuster retrieves predicted performance for all candidate workload solutions from the performance predictor. The workload adjuster proceeds with step 720.

In step 720, the workload adjuster estimates power cost of each candidate workload solution generated in step 310 of FIG. 2, supra, and migration cost for each candidate workload solution from a current workload distribution $X_{current}$. Then the workload adjuster proceeds with step 730.

The power cost of a candidate workload solution $X_{candidate}$ is calculated as a sum of cumulative component level power usage of all component devices in the candidate workload solution $X_{candidate}$ and predicted cooling cost for the candidate workload solution $X_{candidate}$, that is, $$PowerCost(X_{candidate}) = TotalComponentPowerUsage(X_{candidate}) + CoolingCost(X_{candidate}),$$

wherein $TotalComponentPowerUsage(X_{candidate})$ is a sum of all component power usage of the candidate workload solution $X_{candidate}$ based on utilization level of devices employed in the candidate workload solution $X_{candidate}$ according to a respective device power model, and wherein $CoolingCost(X_{candidate})$ is calculated from a predicted maximum temperature of the data center for the candidate workload solution $X_{candidate}$ pursuant to the temperature predictor of FIG. 3 supra.

The migration cost of the candidate workload solution $X_{candidate}$ from the current workload distribution $X_{current}$ is calculated from a transitional cost model respective to workload characteristics of the candidate workload solution $X_{candidate}$ and the device power models for devices employed in the candidate workload solution $X_{candidate}$. The migration cost quantifies performance degradation and/or loss of services during a migration from the current workload distribution $X_{current}$ to the candidate workload solution $X_{candidate}$ based on the device power models and the device performance models. The workload characteristics may be, inter alia, Service Level Objectives (SLO) requirement that determines permitted level of performance degradation during migration, Availability and Performance requirement of workloads, etc. The workload characteristics are accounted to reflect distinctive performance requirements for various types of workloads and applications involved.

In one embodiment of the present invention, workload migration is more strictly constrained because of higher performance requirement as in a production system of the data center. An application of the production system may not tolerate performance degradation during the migration due to near-perfect availability requirement.

In step 730, the workload adjuster calculates overall cost for each candidate workload solution. Then the workload adjuster proceeds with step 740.

The overall cost of a candidate workload solution $X_{candidate}$ is calculated as a sum of the power cost of the candidate workload solution $X_{candidate}$ and the migration cost of the candidate workload solution $X_{candidate}$, that is:

$$OverallCost(X_{candidate}) = PowerCost(X_{candidate}) + MigrationCost(X_{candidate})$$

In step 740, the workload adjuster selects an optimal workload solution $X_{optimal}$ that has a minimum overall cost among all candidate workload solutions. In another embodiment, the optimal workload solution $X_{optimal}$ is selected based on a minimum migration cost to minimize the performance degradation during migration based on specifics of the Service Level Objectives (SLO) requirement. Then the workload adjuster proceeds with step 750.

In step 750, the workload adjuster generates an optimized application map from the optimal workload solution and projected power savings for the optimized application map. Then the workload adjuster terminates and the power optimizer continues with step 350 of FIG. 2, supra.

Figure 6:
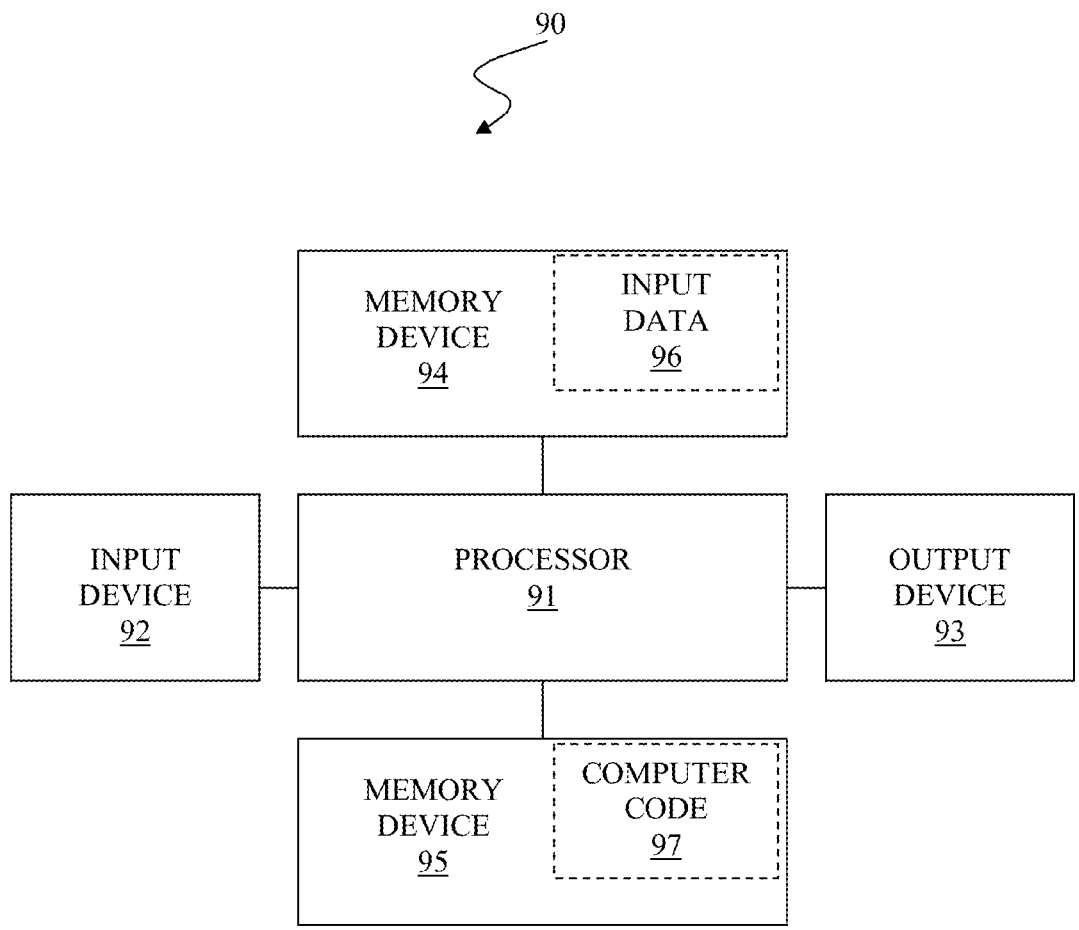
FIG. 6 illustrates a computer system used for optimizing power consumption of a data center by dynamic workload adjustment, in accordance with embodiments of the present invention.

FIG. 6 illustrates a computer system used for optimizing power consumption of a data center by dynamic workload adjustment, in accordance with embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program code that comprises computer-executable instructions. The computer code 97 includes, inter alia, an algorithm used for optimizing power consumption of the data center by dynamic workload adjustment according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer readable storage medium (or a computer usable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer readable storage medium (or said program storage device).

Any of the components of the present invention can be deployed, managed, serviced, etc. by a service provider that offers to deploy or integrate computing infrastructure with respect to a process for optimizing power consumption of the data center by dynamic workload adjustment of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for optimizing power consumption of the data center by dynamic workload adjustment.

In another embodiment, the invention provides a business method that performs the process steps of the invention on a subscription, advertising and/or fee basis. That is, a service provider, such as a Solution Integrator, can offer to create, maintain, support, etc. a process for optimizing power consumption of the data center by dynamic workload adjustment of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing power consumption of a data center by dynamic workload adjustment, said method comprising:

calculating, by a processor of a computer system, a respective temperature profile for each candidate workload solution of at least one candidate workload solution, wherein each candidate workload solution of the at least one candidate workload solution represents a respective application map that specifies a respective workload distribution among application programs of the data center, wherein said calculating is implemented by use of a thermal model of the data center, wherein a respective maximum temperature of the data center associated with the respective temperature profile for each candidate workload solution of the at least one candidate workload solution determines a respective power cost of said each candidate workload solution of the at least one candidate workload solution; and said processor dynamically adjusting a workload of the data center from a current workload distribution to an optimal workload solution, wherein the optimal workload solution is a candidate workload solution of the at least one candidate workload solution having a lowest sum of the respective power cost and a respective migration cost, wherein the respective migration cost quantifies performance degradation during a migration from the current workload distribution to the candidate workload solution of the at least one candidate workload solution, said dynamically adjusting the workload comprising:

estimating a respective overall cost of each candidate workload solution, wherein the estimated respective overall cost is a sum of the respective power cost and the respective migration cost, wherein the respective power cost is calculated from electricity consumed by the data center in employing each candidate workload solution of the at least one candidate workload solution to perform services of the data center within operating temperatures, and wherein the respective migration cost is calculated from performance degradation that occurs during adjusting the workload of the data center from the current workload distribution to each candidate workload solution of the at least one candidate workload solution;

selecting the optimal workload solution from the at least one candidate workload solution of the at least one candidate workload solution, wherein the selected optimal workload solution has a lowest overall cost of the estimated respective overall cost as determined from said estimating; and transferring the selected optimal workload solution to a plurality of devices of the computer system for deployment.

2. The method of claim 1, wherein said calculating the respective temperature profile comprises:
   creating the thermal model from a physical device map that specifies (i) three-dimensional locations of at least one device of the plurality of devices within the data center, (ii) device temperature profiles of a respective temperature measured at a respective inlet of each device of the plurality of devices, and (iii) device configurations comprising a respective identifier of each device of the plurality of devices and a respective operational status of each device of the plurality of devices, wherein the respective operational status of each device of the plurality of devices is either idle or busy, and wherein each device temperature profile of the device temperature profiles is respectively associated with each device configuration of the device configurations; and
   generating the respective temperature profile by applying the thermal model to each candidate workload solution of the at least one candidate workload solution.

3. The method of claim 1, said method further comprising:
   said processor calculating a respective performance profile for each candidate workload solution of the at least one candidate workload solution such that the respective performance profile is evaluated against performance requirements of the data center, wherein the calculated respective performance profile determines the respective migration cost of each candidate workload solution of the at least one candidate workload solution.

4. The method of claim 3, said calculating the respective performance profile comprising:
   creating a performance prediction model that determines a rate of executing workload W in Instructions Per Second, said rate being notated as IPS(W), wherein said rate is calculated as $$IPS(W) = \frac{\text{frequency}}{CPI(W)} = \frac{\text{frequency}}{CPI_{core} + CPI_{memory}},$$

wherein frequency indicates an operating frequency of a device of the plurality of devices, wherein CPI(W) represents Cycles Per Instruction of the workload W, wherein $CPI_{core}$ represents Cycles Per Instruction spent in executing an instruction within a core of the device of the plurality of devices, wherein $CPI_{core}$ is calculated as $CPI_{core}(f_1)+MPI \times M_{latency} \times BF(f_1)$, wherein $CPI_{memory}$ represents Cycles Per Instruction spent in accessing a memory of the device of the plurality of devices to execute the instruction, wherein $CPI_{memory}$ is calculated as $CPI_{core}(f_1)+MPI \times M_{latency} \times (f_2/f_1) \times BF(f_1)$, wherein $f_1$ is a first operating frequency of the core, $f_2$ is a second operating frequency of the memory, MPI indicates a number of Memory accesses Per Instruction, $M_{latency}$ is a memory latency, and BF is a block factor; and
   generating the calculated respective performance profile by applying the performance prediction model to said each candidate workload solution of the at least one candidate workload solution.

5. The method of claim 3, said calculating the respective performance profile comprising:
   creating a performance prediction model that determines a rate of executing workload W in Instructions Per Second on a platform with a server configuration s and an i-th storage device configuration $d_i$, said rate being notated as IPS(W)(s, $d_i$), wherein said rate is calculated as $$IPS(W)(s, d_i) = \frac{s_{frequency}}{CPI(W)} = \frac{s_{frequency}}{\Sigma_i CPI(W)(s, d_i)},$$

wherein $s_{frequency}$ indicates an operating frequency of servers in the platform represented in the server configuration s, wherein CPI(W) represents Cycles Per instruction with the workload W in the platform, wherein $\Sigma_i$ CPI (W)(s, $d_i$)=$\Sigma_i$ ($CPI_{server}$(s, $d_i$)+$CPI_{storage}$(s, $d_i$)), wherein $CPI_{server}$(s, $d_i$) represents a first number of cycles consumed by the servers in the platform when the workload W runs entirely from memory without any disk access, wherein $CPI_{server}$(s, $d_i$) is calculated as $CPI_{server}$(s), wherein $CPI_{storage}$(s, $d_i$) represents a second number of cycles consumed by storage devices in the platform in executing the workload W in the platform, wherein $CPI_{storage}$(s, $d_i$) is calculated as DIOPI× Avg($LUN_{latency}(d_i)$(W))×DBF, wherein DIOPI indicates a number of Disk Input/Output Per Instruction, wherein Avg ($LUNV_{latency}$ ($d_i$)(W)) indicates an average of latency of respective logical volume unit in the i-th storage device configuration $d_i$ with the workload W, and wherein DBF is a disk block factor; and
   generating the calculated respective performance profile by applying the performance prediction model to said each candidate workload solution of the at least one candidate workload solution.

6. The method of claim 1, wherein the computer system comprises an apparatus, wherein the apparatus comprises the processor and a read-only memory (ROM) hard-wired into the apparatus, said ROM containing program code, which, upon being executed by the processor, implements the method, and wherein the apparatus is a special purpose machine specific to the method due to the ROM being hard wired into the apparatus.

7. A computer program product comprising: a computer readable storage device having a computer readable program code embodied therein, said computer readable program code containing instructions that upon being executed by a processor of a computer system perform a method for optimizing power consumption of a data center by dynamic workload adjustment, said method comprising:
   said processor calculating a respective temperature profile for each candidate workload solution of at least one candidate workload solution, wherein each candidate workload solution of the at least one candidate workload solution represents a respective application map that specifies a respective workload distribution among application programs of the data center, wherein said calculating is implemented by use of a thermal model of the data center, wherein a respective maximum temperature of the data center associated with the respective temperature profile for each candidate workload solution of the at least one candidate workload solution determines a respective power cost of said each candidate workload solution of the at least one candidate workload solution; and
   said processor dynamically adjusting a workload of the data center from a current workload distribution to an optimal workload solution, wherein the optimal workload solution is a candidate workload solution of the at least one candidate workload solution having a lowest sum of the respective power cost and a respective migration cost, wherein the respective migration cost quantifies performance degradation during a migration from the current workload distribution to the candidate workload solution of the at least one candidate workload solution, said dynamically adjusting the workload comprising:
  estimating a respective overall cost of each candidate workload solution, wherein the estimated respective overall cost is a sum of the respective power cost and the respective migration cost, wherein the respective power cost is calculated from electricity consumed by the data center in employing each candidate workload solution of the at least one candidate workload solution to perform services of the data center within operating temperatures, and wherein the respective migration cost is calculated from performance degradation that occurs during adjusting the workload of the data center from the current workload distribution to each candidate workload solution of the at least one candidate workload solution;
  selecting the optimal workload solution from the at least one candidate workload solution of the at least one candidate workload solution, wherein the selected optimal workload solution has a lowest overall cost of the estimated respective overall cost as determined from said estimating; and
  transferring the selected optimal workload solution to a plurality of devices of the computer system for deployment.

8. The computer program product of claim 7, wherein said calculating the respective temperature profile comprises:
  creating the thermal model from a physical device map that specifies (i) three-dimensional locations of at least one device of the plurality of devices within the data center, (ii) device temperature profiles of a respective temperature measured at a respective inlet of each device of the plurality of devices, and (iii) device configurations comprising a respective identifier of each device of the plurality of devices and a respective operational status of each device of the plurality of devices, wherein the respective operational status of each device of the plurality of devices is either idle or busy, and wherein each device temperature profile of the device temperature profiles is respectively associated with each device configuration of the device configurations; and
  generating the respective temperature profile by applying the thermal model to each candidate workload solution of the at least one candidate workload solution.

9. The computer program product of claim 7, said method further comprising:
  said processor calculating a respective performance profile for each candidate workload solution of the at least one candidate workload solution such that the respective performance profile is evaluated against performance requirements of the data center, wherein the calculated respective performance profile determines the respective migration cost of each candidate workload solution of the at least one candidate workload solution.

10. The computer program product of claim 9, said calculating the respective performance profile comprising:
  creating a performance prediction model that determines a rate of executing workload W in Instructions Per Second, said rate being notated as IPS(W), wherein said rate is calculated as $$IPS(W) = \frac{\text{frequency}}{CPI(W)} = \frac{\text{frequency}}{CPI_{core} + CPI_{memory}},$$

wherein frequency indicates an operating frequency of a device of the plurality of devices, wherein CPI(W) represents Cycles Per Instruction of the workload W, wherein $CPI_{core}$ represents Cycles Per Instruction spent in executing an instruction within a core of the device of the plurality of devices, wherein $CPI_{core}$ is calculated as $CPI_{core}(f_1)+MPI \times M_{latency} \times BF(f_1)$, wherein $CPI_{memory}$ represents Cycles Per Instruction spent in accessing a memory of the device of the plurality of devices to execute the instruction, wherein $CPI_{memory}$ is calculated as $CPI_{core}(f_1)+MPI \times M_{latency} \times (f_2/f_1) \times BF(f_1)$, wherein $f_1$ is a first operating frequency of the core, $f_2$ is a second operating frequency of the memory, MPI indicates a number of Memory accesses Per Instruction, $M_{latency}$ is a memory, latency, and BF is a block factor; and
  generating the calculated respective performance profile by applying the performance prediction model to said each candidate workload solution of the at least one candidate workload solution.

11. The computer program product of claim 9, said calculating the respective performance profile comprising:
  creating a performance prediction model that determines a rate of executing workload W in Instructions Per Second on a platform with a server configuration s and an i-th storage device configuration $d_i$, said rate being notated as IPS(W)(s, $d_i$), wherein said rate is calculated as $$IPS(W)(s, d_i) = \frac{s_{frequency}}{CPI(W)} = \frac{s_{frequency}}{\sum_i CPI(W)(s, d_i)},$$

wherein $s_{frequency}$ indicates an operating frequency of servers represented in the server configuration s, wherein CPI(W) represents Cycles Per Instruction with the workload W in the platform, wherein $\sum_i CPI(W)(s, d_i)=\sum_i(CPI_{server}(s, d_i)+CPI_{storage}(s, d_i))$, wherein $CPI_{server}(s, d_i)$ represents a first number of cycles consumed by servers in the platform when the workload W runs entirely from memory without any disk access, wherein $CPI_{server}(s, d_i)$ is calculated as $CPI_{server}(s)$, wherein $CPI_{storage}(s, d_i)$ represents a second number of cycles consumed by storage devices in the platform in executing the workload W in the platform, wherein $CPI_{storage}(s, d_i)$ is calculated as $DIOPI \times Avg(LUN_{latency}(d_i)(W)) \times DBF$, wherein DIOPI indicates a number of Disk Input/Output Per Instruction, wherein $Avg(LUN_{latency})(d_i)(W))$ indicates an average of latency of respective logical volume unit in the i-th storage device configuration $d_i$ with the workload W, and wherein DBF is a disk block factor; and
  generating the calculated respective performance profile by applying the performance prediction model to said each candidate workload solution of the at least one candidate workload solution.

12. The computer program product of claim 7, wherein the computer system comprises an apparatus, wherein the apparatus comprises the processor and the storage device, wherein the storage device is a read-only memory (ROM) hard-wired into the apparatus, wherein the ROM contains the program code, and wherein the apparatus is a special purpose machine specific to the method due to the ROM being hard wired into the apparatus.

13. A computer system comprising a processor and a computer readable memory unit coupled to the processor, said computer readable memory unit containing instructions that when run by the processor implement a for optimizing power consumption of a data center by dynamic workload adjustment, said method comprising:

said processor calculating a respective temperature profile for each candidate workload solution of at least one candidate workload solution, wherein each candidate workload solution of the at least one candidate workload solution represents a respective application map that specifies a respective workload distribution among application programs of the data center, wherein said calculating is implemented by use of a thermal model of the data center, wherein a respective maximum temperature of the data center associated with the respective temperature profile for each candidate workload solution of the at least one candidate workload solution determines a respective power cost of said each candidate workload solution of the at least one candidate workload solution; and said processor dynamically adjusting a workload of the data center from a current workload distribution to an optimal workload solution, wherein the optimal workload solution is a candidate workload solution of the at least one candidate workload solution having a lowest sum of the respective power cost and a respective migration cost, wherein the respective migration cost quantifies performance degradation during a migration from the current workload distribution to the candidate workload solution of the at least one candidate workload solution, said dynamically adjusting the workload comprising:

estimating a respective overall cost of each candidate workload solution, wherein the estimated respective overall cost is a sum of the respective power cost and the respective migration cost, wherein the respective power cost is calculated from electricity consumed by the data center in employing each candidate workload solution of the at least one candidate workload solution to perform services of the data center within operating temperatures, and wherein the respective migration cost is calculated from performance degradation that occurs during adjusting the workload of the data center from the current workload distribution to each candidate workload solution of the at least one candidate workload solution;

selecting the optimal workload solution from the at least one candidate workload solution of the at least one candidate workload solution, wherein the selected optimal workload solution has a lowest overall cost of the estimated respective overall cost as determined from said estimating; and transferring the selected optimal workload solution to a plurality of devices of the computer system for deployment.

14. The computer system of claim 13, wherein said calculating the respective temperature profile comprises:

creating the thermal model from a physical device map that specifies (i) three-dimensional locations of at least one device of the plurality of devices within the data center, (ii) device temperature profiles of a respective temperature measured at a respective inlet of each device of the plurality of devices, and (iii) device configurations comprising a respective identifier of each device of the plurality of devices and a respective operational status of each device of the plurality of devices, wherein the respective operational status of each device of the plurality of devices is either idle or busy, and wherein each device temperature profile of the device temperature profiles is respectively associated with each device configuration of the device configurations; and generating the respective temperature profile by applying the thermal model to each candidate workload solution of the at least one candidate workload solution.

15. The computer system of claim 13, said method further comprising:

said processor calculating a respective performance profile for each candidate workload solution of the at least one candidate workload solution such that the respective performance profile is evaluated against performance requirements of the data center, wherein the calculated respective performance profile determines the respective migration cost of each candidate workload solution of the at least one candidate workload solution.

16. The computer system of claim 15, said calculating the respective performance profile comprising:

creating a performance prediction model that determines a rate of executing workload W in Instructions Per Second, said rate being notated as IPS(W), wherein said rate is calculated as $$IPS(W) = \frac{\text{frequency}}{CPI(W)} = \frac{\text{frequency}}{CPI_{core} + CPI_{memory}},$$

wherein frequency indicates an operating frequency of a device of the plurality of devices, wherein CPI(W) represents Cycles Per Instruction of the workload W, wherein $CPI_{core}$ represents Cycles Per Instruction spent in executing an instruction within a core of the device of the plurality of devices, wherein $CPI_{core}$ is calculated as $CPI_{core}(f_1)$+MPI×$M_{latency}$×BF($f_1$), wherein $CPI_{memory}$ represents Cycles Per Instruction spent in accessing a memory of the device of the plurality of devices to execute the instruction, wherein $CPI_{memory}$ is calculated as $CPI_{core}(f_1)$+MPI×$M_{latency}$×($f_2$/$f_1$)×BF($f_1$), wherein $f_1$ is a first operating frequency of the core, $f_2$ is a second operating frequency of the memory, MPI indicates a number of Memory accesses Per Instruction, $M_{latency}$ is a memory latency, and BF is a block factor; and generating the calculated respective performance profile by applying the performance prediction model to said each candidate workload solution of the at least one candidate workload solution.

17. The computer system of claim 15, said calculating the respective performance profile comprising:

creating a performance prediction model that determines a rate of executing workload W in Instructions Per Second on a platform with a server configuration s and an i-th storage device configuration $d_i$, said rate being notated as IPS(W)(s, $d_i$), wherein said rate is calculated as $$IPS(W)(s, d_i) = \frac{s_{frequency}}{CPI(W)} = \frac{s_{frequency}}{\sum_i CPI(W)(s, d_i)},$$

wherein $s_{frequency}$ indicates an operating frequency of servers represented in the server configuration s, wherein CPI(W) represents Cycles Per Instruction with the workload W in the platform, wherein $\Sigma_i CPI(W)(s, d_i) = \Sigma_i (CPI_{server}(s, d_i) +$ $CPI_{storage}(s, d_i)$), wherein $CPI_{server}(s, d_i)$ represents a first number of cycles consumed by servers in the platform when the workload W runs entirely from memory without any disk access, wherein $CPI_{server}(s, d_i)$ is calculated as $CPI_{server}(s)$, wherein $CPI_{storage}(s, d_i)$ represents a second number of cycles consumed by storage devices in the platform in executing the workload W in the platform, wherein $CPI_{storage}(s, d_i)$ is calculated as $DIOPI \times Avg(LUN_{latency}(d_i)(W)) \times DBF$, wherein DIOPI indicates a number of Disk Input/Output Per Instruction, wherein $Avg(LUN_{latency}(d_i)(W))$ indicates an average of latency of respective logical volume unit in the i-th storage device configuration $d_i$ with the workload W, and wherein DBF is a disk block factor; and generating the calculated respective performance profile by applying the performance prediction model to said each candidate workload solution of the at least one candidate workload solution.

18. The computer system of claim 13, wherein the computer system comprises an apparatus, wherein the apparatus comprises the processor and the memory unit, wherein the memory unit is a read-only memory (ROM) hard-wired into the apparatus, wherein the RUM contains the instructions, and wherein the apparatus is a special purpose machine specific to the method due to the ROM being hard wired into the apparatus.

\* \* \* \* \*